United States Patent
Swamy et al.

(10) Patent No.: US 9,100,489 B2
(45) Date of Patent: Aug. 4, 2015

(54) MANAGING GROUPS USING TELEPHONES

(75) Inventors: Sanjay Swamy, Bangalore (IN); Amiya Pathak, Bangalore (IN); Valerie Rozycki Wagoner, Modesto, CA (US); Amit Sharma, Chandigarh (IN)

(73) Assignee: ZIPDIAL MOBILE SOLUTIONS PVT. LTD, Bangalore (IN)

( * ) Notice: Subject to any disclaimer, the term of this patent is extended or adjusted under 35 U.S.C. 154(b) by 0 days.

(21) Appl. No.: 14/349,667

(22) PCT Filed: Sep. 8, 2012

(86) PCT No.: PCT/US2012/054331
§ 371 (c)(1),
(2), (4) Date: Apr. 16, 2014

(87) PCT Pub. No.: WO2013/036887
PCT Pub. Date: Mar. 14, 2013

(65) Prior Publication Data
US 2014/0247931 A1    Sep. 4, 2014

(51) Int. Cl.
*H04M 3/42*   (2006.01)
*H04W 4/16*   (2009.01)
*H04M 3/56*   (2006.01)
*H04W 4/20*   (2009.01)

(52) U.S. Cl.
CPC ............. *H04M 3/563* (2013.01); *H04W 4/20* (2013.01); *H04W 4/16* (2013.01)

(58) Field of Classification Search
CPC .......... H04M 3/563; H04W 4/16; H04W 4/20
USPC ............. 379/201.01, 201.02, 207.08, 207.09, 379/207.1; 455/414.1
See application file for complete search history.

(56) References Cited

U.S. PATENT DOCUMENTS

| | | | |
|---|---|---|---|
| 6,751,485 B2 * | 6/2004 | Ranta | 455/567 |
| 7,899,447 B2 * | 3/2011 | Takuno et al. | 455/418 |
| 8,509,742 B2 * | 8/2013 | Gopinath et al. | 455/412.1 |
| 8,654,946 B1 * | 2/2014 | Patro et al. | 379/201.01 |
| 8,825,024 B2 * | 9/2014 | Anderl et al. | 455/414.1 |
| 2006/0067498 A1 * | 3/2006 | Plas et al. | 379/201.01 |
| 2007/0133771 A1 * | 6/2007 | Stifelman et al. | 379/142.01 |
| 2007/0243858 A1 * | 10/2007 | Marathe et al. | 455/412.2 |
| 2009/0202058 A1 * | 8/2009 | Khan | 379/142.08 |

* cited by examiner

Primary Examiner — Harry S Hong
(74) Attorney, Agent, or Firm — Narendra Reddy Thappeta

(57) ABSTRACT

An aspect of the present invention facilitates formation of groups using missed calls. In an embodiment, upon receipt of a first missed call to a pre-specified number from a first user, a missed call server allocates a first phone number to a new group. Upon receiving missed calls to such allocated number, the corresponding callers (i.e., the phone numbers of the callers) are added to the group. According to another aspect of the present invention, different phone numbers are allocated for different groups, and the members are added in each group, in response to missed calls to the corresponding numbers. Additional management tasks such as provide group owner the ability to approve/reject the addition/removal requests, formation of sub-groups, etc., are also facilitated based on missed calls.

20 Claims, 4 Drawing Sheets

MANAGING GROUPS USING TELEPHONES

RELATED APPLICATION

This is a National Phase Application under the PCT corresponding to International Application Number PCT/US12/54331, Entitled, "Managing Groups Using Telephones", filed on 8 Sep. 2012, naming as first inventor: Sanjay Swamy, which is incorporated herein by reference in its entirety for all purposes.

BACKGROUND OF THE INVENTION

1. Technical Field

The present disclosure generally relates to communication technologies, and more specifically to a method and system for managing groups using telephones.

2. Related Art

Telephones (phones) are commonly used by users to make phone calls with other users. Networks are provided based on wire-based (e.g., conventional PSTN) technologies and wireless technologies (e.g., GSM, CDMA) to provide the required connectivity. Telephones may be provided with enhanced capabilities such as short message service (SMS), multimedia message service (MMS), e-mails, etc. as is well known in the relevant arts.

Groups refer to a collection of individuals who may be associated with each other through a common theme or motivation such as hobbies, sports and games, shared interests, etc. For example, many individuals who have a common interest in a genre of music may form a group, to exchange ideas, news, information pertaining to the genre, etc. among themselves. Similarly, groups may be formed through common interest in movies, food, cricket, football, driving, nature, adventure, philately, etc.

There is a general need to enable users of phones to manage groups meeting one or more of requirements such as with reduced cost, simplicity, and enhanced access (potentially anywhere and anytime).

BRIEF DESCRIPTION OF THE DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Definitions

Figure 1:
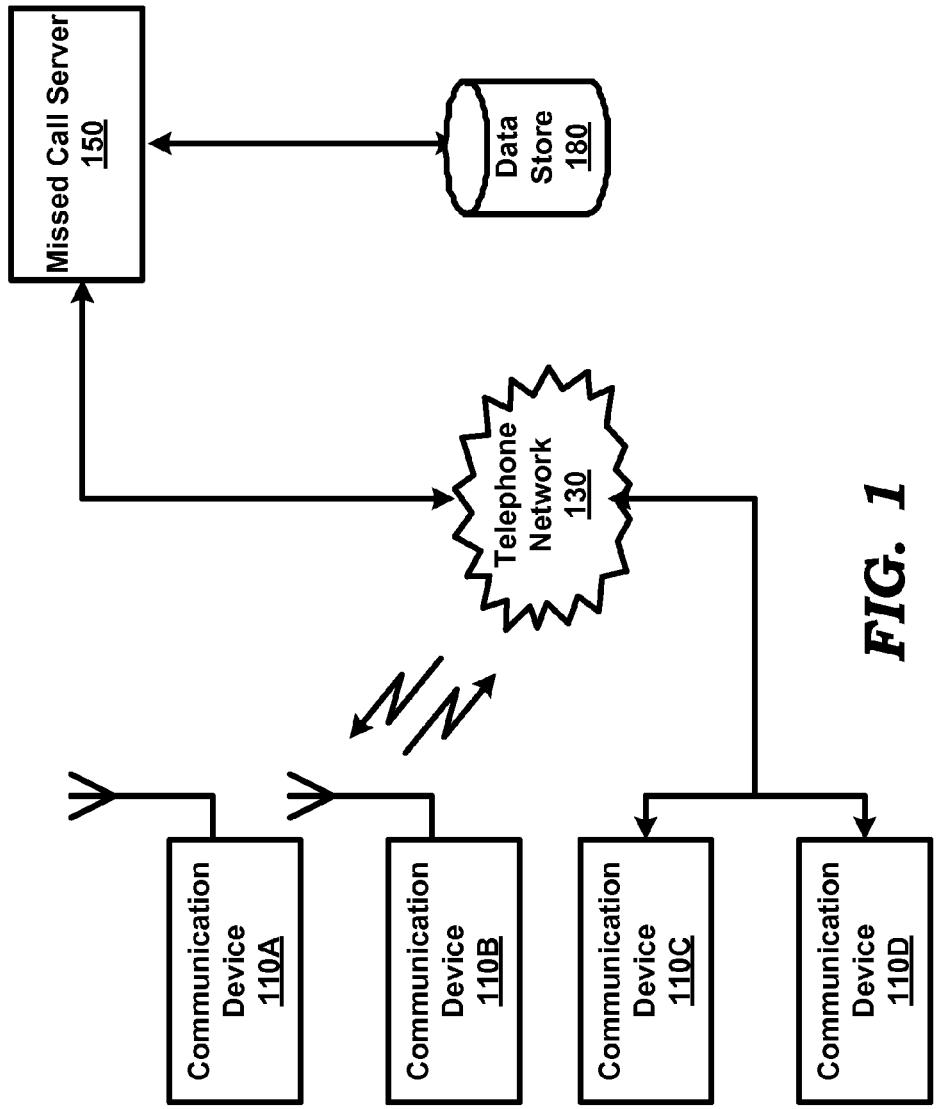
FIG. 1 is a block diagram illustrating the details of an example environment (computing system) in which several aspects of the present invention can be implemented.

A missed call may be better understood in relation to a completed call. When a user/caller places a call, the telephone network signals the callee/recipient of the incoming call such that the telephone at the receiving end can provide a corresponding indication (e.g., ringing sound, the phone number of the caller, etc.) such that the recipient can accept/reject/ignore the call. In the scenario that the recipient accepts the call, a communication link/path is established between the caller and the recipient phones, thereby enabling the caller and the recipient user to start communication with each other using respective telephones. The establishment of a communication link for transfer of voice/visual content between the two sides to a call indicates a completed call.

A missed call, in contrast, represents a call where such a communication link is not established, for example, due to the caller disconnecting ('hanging up' or rejecting) during the provisioning of the indication, the recipient phone being unavailable to receive calls (e.g., due to being used for other phone calls) or the (intended) recipient ignoring the call. The telecommunication company providing the calling service typically does not associate any cost for a missed call to either the caller or the intended recipient.

In the description herein, it is conveniently assumed that each telephone with a unique assigned telephone number is associated with a corresponding user. Thus, reference to a user being a caller or recipient implies the corresponding telephone being used for the corresponding function (of calling or being called).

2. Overview

An aspect of the present invention facilitates formation of groups using missed calls. In an embodiment, upon receipt of a first missed call to a pre-specified number from a first user, a missed call server allocates a first phone number to a new group. Upon receiving missed calls to such allocated number, the corresponding callers (i.e., the phone numbers of the callers) are added to the group.

According to another aspect of the present invention, different phone numbers are allocated for different groups, and the members are added in each group, in response to missed calls to the corresponding numbers.

According to one more aspect of the present invention, each group is allocated a corresponding number for removal as members of the group. In response to receiving of a missed call to such allocated number, the corresponding member is removed from the group.

According to yet another aspect of the present invention, a missed call server generates a respective number for 'approve' and 'reject' actions, and sends both the numbers to the group owner when a caller seeks to be added or removed from a group. The group owner may give a missed call to one of the two numbers for corresponding action with respect to the caller seeking to be added/removed.

According to an additional aspect of the present invention, each member of a group may be provided a respective number. Callers to each of such number is formed as a sub-group of the group.

Once groups are thus formed, communication activities with the entire group may be simplified. For example, a single message can be sent to cause the message to be forwarded to all the members of the group then.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

3. Example Environment

FIG. 1 is a block diagram illustrating the details of an example environment (computing system) in which several aspects of the present invention can be implemented. The example environment is shown containing communication devices 110A-110D, telephone network 130, missed called server (MCS) 150 and data store 180.

Merely for illustration, only representative number/type of systems and locations is shown in the Figure. Many environments often contain many more systems, both in number and type depending on the purpose for which the environment is designed. Each component/block of FIG. 1 is described below in further detail.

Telephone network 130 provides connectivity for communication devices 110A-110D via wired paths (such as between 110C, 110D and 130) or wireless paths (such as between 110A, 110B and 130) or a combination of both. Network 130 may be implemented to support various wired standards/protocols such as public switched telephone network (PSTN), integrated services digital network (ISDN), etc. and wireless standards/protocols such as global system of mobile communications (GSM), code-division multiple access (CDMA), etc. well known in the relevant arts.

The connectivity can be the basis for making various calls (e.g., voice calls, video calls), and also enhanced services such as SMS (short messaging service), GPRS, etc., at least in case of communication devices implemented as cell/mobile phones. Telephone network 130 further provides to each callee/recipient the identity (phone number) of the corresponding caller.

Each of the communication devices 110A-110D represents a device such as phones (either landline or mobile), personal/portable/tablet computer, workstation, etc., which is capable of making or receiving phone calls using some of the standards/protocols supported by telephone network 130. In the following description, it is assumed that phone numbers are used to uniquely identify each communication device on telephone network 130. It is further assumed that each communication device is associated with a single phone number.

However, in alternative embodiments, each communication device may be uniquely associated with other types and/or number of identifiers (e.g., with multiple phone numbers). The various features of the present invention can be implemented in such alternative embodiment also without departing from the scope and spirit of various aspects of the present invention, as will be apparent to one skilled in the relevant arts by reading the disclosure provided herein.

Data store 180 represents a non-volatile (persistent) storage facilitating storage and retrieval of a collection of data by MCS 150. Data store 180 may be implemented as a database server using relational database technologies and accordingly provide storage and retrieval of data using structured queries such as SQL (Structured Query Language). Alternatively, data store 180 may be implemented as a file server providing storage and retrieval of data in the form of files organized as one or more directories, as is well known in the relevant arts.

MCS 150 represents a server which has access to information indicating the missed calls received to a set of numbers. These set of numbers can be assigned by telephone operators (e.g., AT&T, Verizon, and Bell Operating Companies in US; Airtel, Vodafone, BSNL in India) to a service provider intending to provide services according to several aspects of the present invention. In an embodiment, telephone network 130 is configured to terminate calls to all such numbers at MCS 150. MCS 150 may be designed to disconnect calls to such numbers, since only missed calls may be required for various purposes described in relation to the example embodiments described below. Alternatively, a server (not shown) provided within telephone network may simply provide the missed call information to MCS 150, e.g., periodically.

Various aspects of the present invention facilitates users of communication devices such as 110A-D to manage groups using missed calls, as described below with examples.

3. Creating Groups

Figure 2:
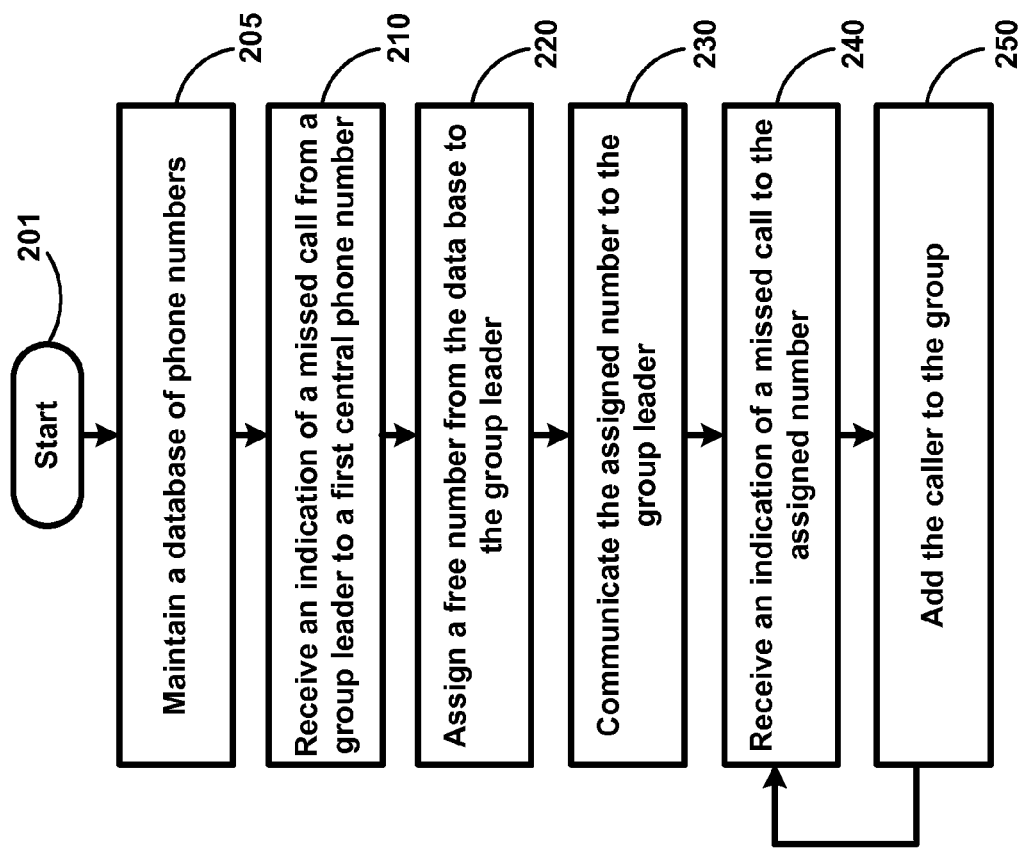
FIG. 2 is a flow chart illustrating the manner in which users of phones are enabled to create groups according to an aspect of the present invention.

FIG. 2 is a flowchart illustrating the manner in which users of phones/communication devices may create groups using missed calls according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 201, in which control immediately passes to step 205.

In step 205, missed call server (MCS) 150 maintains a database of phone numbers, using which groups can be managed in accordance with various features described herein. For example, a telephone operator may have allocated numbers "3300500" to "3300549" to MCS 150 as a result of the service provider purchasing 50 lines for providing the service of creating groups using missed calls.

In step 210, missed call server (MCS) 150 receives an indication of a missed call from a group leader to a first central phone number. The group leader is a user of a communication device 110A-D who wishes to create a group. The group leader makes a call to a first central phone number, which is advertised (over various communication media such as voice, sms, email, print media, TV, radio, cable, etc.) by the service provider providing the facility of creating groups using missed calls.

The indication may be received when a user places a call to the first central phone number using a communication device and immediately disconnects the call. MCS 150 may also determine the phone number of the caller/user using caller identification (CallerID) feature. For example, if "33300102" is a first central number, advertised as the number to be called for creating groups, and the user of a communication device with number "9898989898" (group leader) wishing to create a group, makes a call to "33300102", MCS 150 disconnects the call from "9898989898", and receives an indication that a missed call has been received from "98989898".

In step 220, MCS 150 assigns a free number from the database to the group leader. A free number is a phone number in the database which has not yet been assigned to any user. MCS 150 may mark the assigned number as "assigned" in the database (to indicate that it is no longer free). For example, let "33300501" be the assigned number for the group sought to be formed based on missed call from 9898989898.

In step 230, MCS 150 communicates the assigned number to the group leader. The assigned number may be communicated to the group leader through any suitable technology such as, sms, email, voice, etc. The group leader may communicate (over any of communication media such as sms, email, voice, paper, etc.) the assigned number with an invitation to join the group, to all those users (potential group members) of communication devices whom the group leader wishes to invite. In the example above, the group leader may communicate the assigned number "33300501" to potential group members.

In step 240, MCS 150 receives an indication of a missed call to the assigned number, presumably from one of the persons interested in joining the group. In the example above, the interested among the potential group members make a missed call to "33300501" and MCS 150 receives indication of the missed calls and the callers' phone numbers.

In step 250, MCS 150 adds the caller (i.e., the phone number from which the missed call is received) to the group. MCS 150 may maintain a table for each group with the phone numbers of the group leader and members. The phone number of the caller who made a missed call by calling the assigned number may be added to the table. MCS 150 may send a membership confirmation to the caller through various communication media such as sms, email, voice, etc. In step 260, control passes back to step 240.

Thus, MCS 150 facilitates creation of groups in response to missed calls placed by users of phones. Having formed a group, at least some of the members of the group may have a need to modify the group to allow members to leave. An aspect of the present invention enables a member of an existing group to modify the group using missed calls, as described below with examples.

4. Removal from Groups

Figure 3:
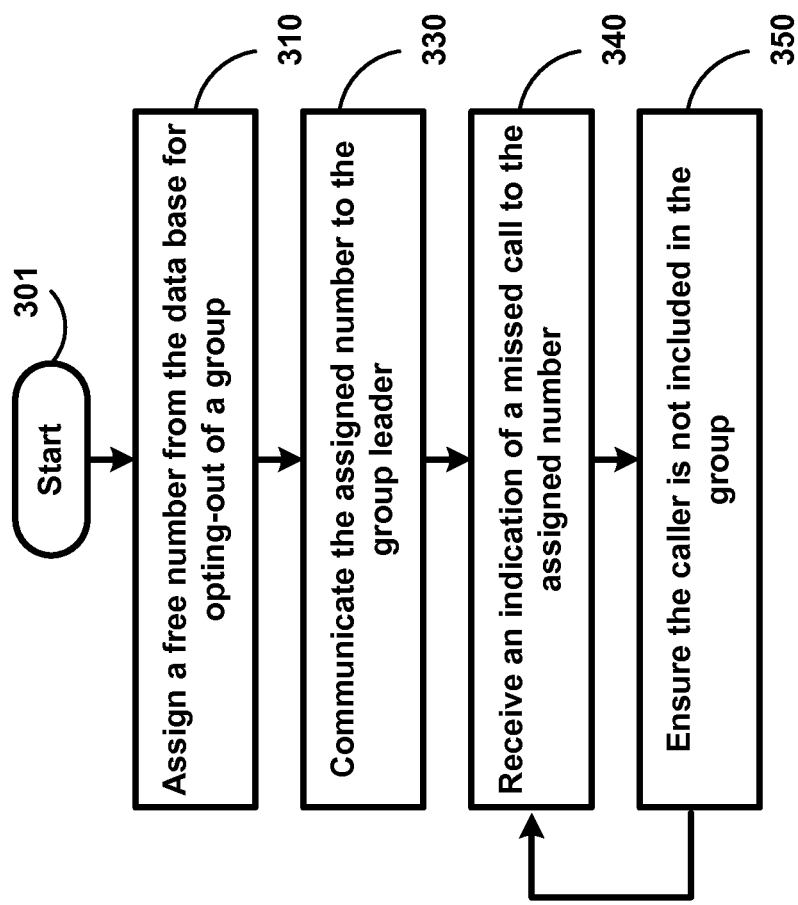
FIG. 3 is a flowchart illustrating the manner in which users of phones who are members of a group are enabled to leave or opt-out of groups according to an aspect of the present invention.

FIG. 3 is a flowchart illustrating the manner in which users of phones/communication devices may modify existing groups using missed calls according to an aspect of the present invention. It may be noted that the modification as envisaged herein is not restricted to only those groups which have been created in section 3 (FIG. 2) above, but also apply to groups formed by other mechanisms (e.g., a group leader configuring a group by accessing MCS 150 using Internet) as well. The flowchart is described with respect to FIGS. 1 and 2 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 301, in which control immediately passes to step 305.

In step 310, MCS 150 assigns a free (not yet assigned) number from the data base for opting-out of a group. Such a number may be assigned when the group formation request is received in step 210. Alternatively, a separate/second central phone number may be used and a missed call to this number from a group leader (assuming each group leader has only a single number) is viewed as a request for a number for removal for that group, and another free number may accordingly be assigned. As yet another alternative, a group leader may logon to MCS 150 using Internet and request the number to be dialed for opting-out.

In step 330, MCS 150 communicates the assigned number to the group leader. Assuming the number is assigned in response to step 210, the number of steps 230 and 330 can be communicated via a single SMS. The group leader may communicate the number for removal or opting-out to various potential/actual members.

In step 340, MCS 150 receives an indication of a missed call to the assigned number (of step 330). In step 350, MCS 150 ensures the caller (or the corresponding phone number) is not included in the group. For example, if a member is already present in the group, the member is removed from the group.

MCS 150 may send a confirmation to the caller of the removal of the caller from the group through various communication media such as sms, email, voice, etc. The loop of steps 340 and 350 may be repeated for each user to be removed.

5. Other Management Features

In an embodiment, all members of a group (instead of only the group leader) are provided with a third central phone number (different groups having different third central phone number). When a member of the group makes a missed call to the third central phone number, the member is assigned a free number (similar to the assigned number for the group leader in step 320 above) and communicated to the calling group member. The member may then communicate the assigned number to potential group members (group candidate). Any group candidate who makes a missed call to the assigned number may be added to a sub group of the corresponding member (who communicated the assigned number to the group candidate) and the subgroup may be associated with the group. It should be appreciated that there are various separate scenarios: 1) any group member (leader or otherwise) may add new members to the main group; and 2) any group member (leader or otherwise) may add new members to a sub-group.

In another embodiment, the group leader may be provided with statistics about the group and information such as number (count) of members who have joined, their personal details, etc.

In yet another embodiment, the group leader may be provided with various options such as approving or rejecting membership, etc. When MCS 150 receives the indication in step 240 above, the group leader may be sent a communication (over communication media such as sms, email, voice, etc.) with various options (such as accept member, reject member, etc.) and associated phone numbers to which missed calls are to be placed, to exercise the option. The group leader may make missed calls to the appropriate numbers to exercise the desired option. For example, a group leader may receive communication indicating number N1 is to be dialed for accepting the user who has dialed in, and number N2 is to be dialed for rejecting the addition of the user. The group leader may accordingly dial one of the two numbers for the desired action. While the feature is described with respect to addition of a group member merely for illustration, similar control can be provided to the group leader in case of removal or other management actions (e.g., profile of the group sought to be changed by someone by accessing the MCS 150 over Internet), using a similar approach.

The features described above can be implemented in different embodiments of MCS 150. The description is continued with respect to an example embodiment.

Missed Call Server

Figure 4:
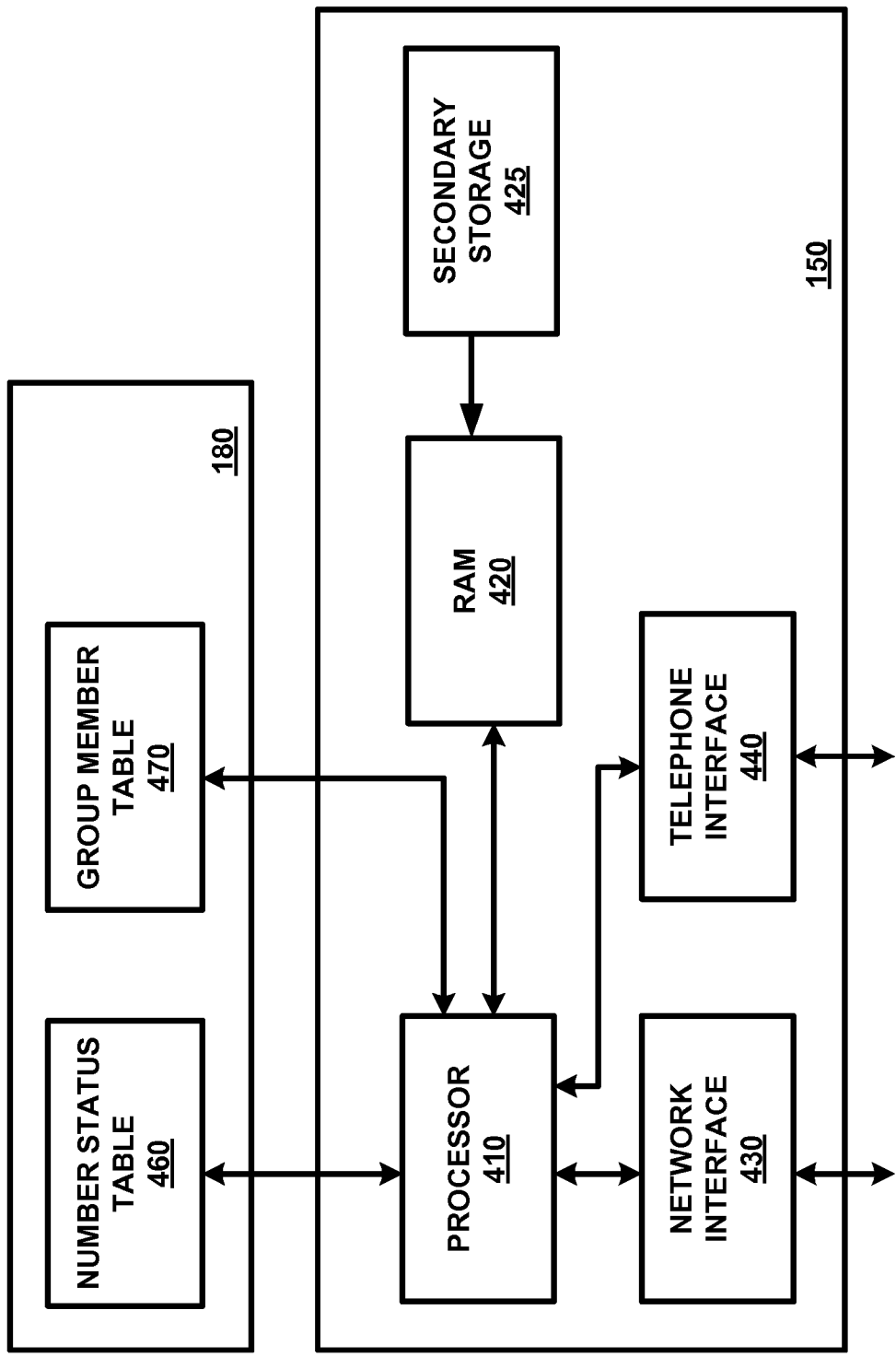
FIG. 4 is a block diagram illustrating the details of a digital processing system in which various aspects of the present invention are operative by execution of appropriate executable modules.

FIG. 4 is a block diagram illustrating the details of a missed call server (MCS) and data store such as MCS 150 and data store 180, in one embodiment. MCS 150 may contain one or more processors 410, memory 420, network interface 430 and telephone interface 440. Data store 180 may contain number status table 460 and group member table 470. The components of FIG. 4 are described below in further detail.

Processor 410 executes instructions stored in memory 420 to provide various group management features describe above. Processor 410 may contain multiple processing units such as a central processing unit (CPU), graphic processing unit (GPU), etc., with each processing unit potentially being designed for a specific task. Alternatively, Processor 410 may contain only a single general-purpose processing unit.

RAM 420 may receive instructions from secondary memory 425, and execute the received instructions to provide several features described above. Secondary storage 425 (non-volatile memory providing a non-transitory medium) may store software instructions constituting operating environment, other software programs such as device drivers, virtual machines, etc., which provide a (common) run time environment for execution of other/user programs. Some of such user programs together may provide the features described above with respect to FIGS. 1-3.

Telephone interface 440 provides connectivity to telephone network 130 and receives various missed calls (and for sending SMS type communications, etc., which are possible using a telephone network). The information related to missed calls is forwarded to processors 410 for further processing. Network interface 430 provides the connectivity to Internet, such that communication devices and computer systems, equipped with Internet access capability can interact with MCS 150.

Number status table 460 stores the status of allocation of various numbers, and is implemented as shown below in an example embodiment.

TABLE I

| S1. | Phone Number | Allocated (Y/N) | Purpose | Expiration Time | Group ID |
|---|---|---|---|---|---|
| 1 | 3300500 | N | | | |
| 2 | 3300501 | Y | Add | June 24 2012; 9:30 AM | 9898989898-1 |
| ... | ... | ... | ... | ... | ... |
| 50 | 3300549 | Y | Opt-out | June 24 2012; 9:30 PM | 9898989898-1 |

Group number table has six columns, sl no., phone number, allocated (Y/N), purpose, expiration time, and group id, as shown above. Column 1, sl. no. is a running count of the number of phone numbers available. Column 2, phone number contains the available phone numbers to be allocated for the groups. Column 3, Allocated (Y/N) indicates whether the corresponding phone number in column 2 has been allocated to a group (Y) or is free, that is not allocated (N). When a phone number is allocated to a group, MCS 150 changes the corresponding column to "Y". Column 4 may indicate one of 'Add' (i.e., assigned in step 220), opt-out (i.e., assigned in step 310), sub-group (in which case additional columns, not shown, may be present in the table to store the parent group information and the specific owner of this sub-group).

Column 5 indicates the time stamp indicating the expiration time of the entry/row. At the expiry, the corresponding number is de-allocated, column 3 is marked as "N" and the group id in column 5 is reset, and the number may be allocated to another group, probably after an interval of time to avoid calls from users who were invited for the previous group spilling over to the next group. Column 6 group id indicates an identification of the group to which the phone number has been allocated. The group-id conveniently contains the phone number of the group leader as well.

Group member table 470 is a table listing the members of each group (identified by their phone number). As shown below, the group ID column identifies the group, and the Member List column contains the list of members for the corresponding group.

TABLE 2

| S1 no. | Group ID | Member List (phone numbers) |
|---|---|---|
| 1. | 9898989898-1 | |
| 2 | 9898989844-1 | |
| ... | 9898984545-1 | |
| n. | 9898932443-1 | |

It may be appreciated that in various embodiments, other details such as the inviter (person who invited a member to the group) identified by the inviter's phone number, date and time a member joined the group/sub group, etc. also may be stored in table 470.

Tables such as the above may be used to provide the features described above.

From the above, it may be appreciated that various group management tasks can be performed using missed call features. Since missed calls are often not charged, the solution may be cost-effective. In addition, since missed calls can be placed from any phone, the solution provides enhanced access and simplicity.

Once groups are managed and formed, various group communication activities may be simplified, potentially using external servers tailored for that form of communication. For example, a single message sent in the form of a SMS may be forwarded to all members of the group.

In one more embodiment, the group members may be provided with targeted action such as offers, discount coupons, etc. For example, members of a new "lunch group" may be offered discounts for lunch by various restaurants or once a group exceeds a size, say 5 members, discounts may be offered, or a restaurant may offer discounts to new members of a group who are not members of the groups for that restaurant, etc. Further, the "lunch group" may have sub groups such as "Chinese cuisine" lunch sub group, "Continental cuisine" lunch sub group, "Indian cuisine" lunch sub group, etc. and the offers and other targeted action may be directed according to the characteristics of the sub group, such as Chinese restaurants making special offers to the "Chinese cuisine" lunch sub group, etc. The MCS can store these rules about when to reward users with what, and based on real-time activities, those rewards can be triggered.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

12. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

We claim:

1. A method of forming groups, said method being implemented in a digital processing system comprising at least one processor, said method comprising:
    receiving, by said at least one processor, a first indication that a first missed call is received to a pre-specified number from a first user;
    allocating, by said at least one processor, a first phone number to a new group in response to said receiving of said first missed call to said pre-specified number;
    receiving, by said at least one processor, a second indication that a second user placed a second missed call to said first phone number; and
    adding, by said at least one processor, said second user to said new group.

2. The method as claimed in claim 1, comprising:
    maintaining a database of a plurality of phone numbers, said plurality of phone numbers including said first phone number,
    wherein said database storing data for tracking which numbers have been allocated and which numbers have not been allocated,
    wherein said allocating allocates as said first phone number, one of said numbers, which have not yet been allocated, at the time of receiving said first indication.

3. The method as claimed in claim 1, wherein the first phone number is allocated to said new group for only a pre determined period of time.

4. The method as claimed in claim 1, comprising:
    in response to said receiving said second indication, said first user receiving a notification that the second user placed the second missed call, wherein said first user is enabled to allow or disallow said adding.

5. The method as claimed in claim 4, comprising:
    allocating a third phone number and a fourth phone number to said first user,
    wherein said first user places a missed call to said third phone number to allow said adding, and wherein said first user places a missed call to said fourth phone number to disallow said adding.

6. The method as claimed in claim 1, comprising:
    allocating a fifth phone number to said new group for facilitating removal of members from said new group;
    receiving a fourth indication that a member of said group placed a fourth missed call to said fifth phone number; and
    removing said member of said group from the group,
    wherein said removing is performed in response to said receiving of said fourth indication.

7. The method of claim 6, wherein said first fifth phone number is allocated to said new group in response to receiving a missed call to a second pre-specified number from said first user.

8. The method as claimed in claim 1, comprising:
    receiving a fifth indication that said second user placed a fifth missed call for modifying said new group;
    allocating a sixth phone number to said second user;
    receiving a sixth indication that a third user placed a sixth missed call to said sixth phone number; and
    adding said third user to a second user subgroup of said new group.

9. A non-transitory machine readable medium carrying one or more sequences of instructions for management of groups, wherein execution of said one or more sequences of instructions by one or more processors contained in a digital processing system causes said digital processing system to perform the actions of:
    receiving a first missed call from a first user and a second missed call from a second user, both of said first missed call and said second missed call being to a first pre-specified number, each missed call to said first pre-specified number being for forming a corresponding new group;
    allocating a first phone number as being for a first group in response to said receiving of said first missed call, and a second phone number as being for a second group in response to said receiving of said second missed call;
    receiving missed calls to said first phone number from a first set of users, and to said second phone number from a second set of users;
    adding said first set of users to said first group in response to said missed calls to said first number, and said second set of users to said second group in response to said missed calls to said second number;
    receiving a first message and a second message respectively directed to said first group and said second group; and
    forwarding said first message to each of said first set of users in view of said first set of users having been added to said first group, and said second message to each of said second set of users in view of said second set of users having been added to said second group.

10. The non-transitory machine readable medium of claim 9, further comprising:
    maintaining a database of a plurality of phone numbers, said plurality of phone numbers including said first phone number and said second phone number, said database storing data for tracking which numbers have been allocated and which numbers have not been allocated, wherein said database indicates that said first number and said second number are not yet allocated at the respective time of receiving of said first missed call and said second missed call, wherein the data in said database is updated to indicate that said first number and said number are no longer available after said allocating allocates said first phone number and said second phone number to said first group and said second group respectively.

11. A digital processing system comprising:
a telephone interface;
one or more memory units to store instructions;
one or more processors to retrieve and execute said instructions stored in said one or more memory units, wherein execution of said instructions causes the actions of:
receiving a first indication from said telephone interface that a first missed call is received to a pre-specified number from a first user;
allocating a first phone number to a new group in response to said receiving of said first missed call to said pre-specified number;
receiving a second indication from said telephone interface that a second user placed a second missed call to said first phone number;
adding said second user to said new group;
receiving a first message directed to said new group; and
forwarding said first message to each member of said new group including said second user.

12. The digital processing system as claimed in claim 11, the actions comprising:
maintaining a database of a plurality of phone numbers, said plurality of phone numbers including said first phone number,
wherein said database storing data for tracking which numbers have been allocated and which numbers have not been allocated,
wherein said allocating allocates as said first phone number, one of said numbers, which have not yet been allocated, at the time of receiving said first indication.

13. The digital processing system as claimed in claim 11, wherein the first phone number is allocated to said new group for only a pre determined period of time.

14. The non-transitory machine readable medium as claimed in claim 9, wherein the first phone number is allocated to said new group for only a pre determined period of time.

15. The non-transitory machine readable medium as claimed in claim 9, comprising one or more instructions for:
in response to said receiving said second indication, said first user receiving a notification that the second user placed the second missed call, wherein said first user is enabled to allow or disallow said adding.

16. The non-transitory machine readable medium as claimed in claim 15, comprising one or more instructions for:
allocating a third phone number and a fourth phone number to said first user,
wherein said first user places a missed call to said third phone number to allow said adding, and wherein said first user places a missed call to said fourth phone number to disallow said adding.

17. The non-transitory machine readable medium as claimed in claim 9, comprising one or more instructions for:
allocating a fifth phone number to said new group for facilitating removal of members from said new group;
receiving a fourth indication that a member of said group placed a fourth missed call to said fifth phone number; and
removing said member of said group from the group,
wherein said removing is performed in response to said receiving of said fourth indication.

18. The non-transitory machine readable medium of claim 17, wherein said fifth phone number is allocated to said new group in response to receiving a missed call to a second pre-specified number from said first user.

19. The non-transitory machine readable medium as claimed in claim 9, comprising one or more instructions for:
receiving a fifth indication that said second user placed a fifth missed call for modifying said new group;
allocating a sixth phone number to said second user;
receiving a sixth indication that a third user placed a sixth missed call to said sixth phone number; and
adding said third user to a second user subgroup of said new group.

20. The method as claimed in claim 1, further comprising:
receiving a first message directed to said new group; and
forwarding said first message to each member of said new group including said second user.

* * * * *